Aug. 30, 1927.

T. E. MURRAY, JR 1,640,798

METHOD OF ELECTRIC WELDING

Filed Aug. 19, 1922

INVENTOR.

Thomas E. Murray, Jr.
BY
ATTORNEY.

Patented Aug. 30, 1927.

1,640,798

UNITED STATES PATENT OFFICE.

THOMAS E. MURRAY, JR., OF BROOKLYN, NEW YORK.

METHOD OF ELECTRIC WELDING.

Application filed August 19, 1922. Serial No. 582,366.

My invention aims to provide an improved method of joining two parts of sheet or other metal by welding them in a way having certain advantages over the usual methods.

The accompanying drawings illustrate embodiments of the invention.

Figure 1:
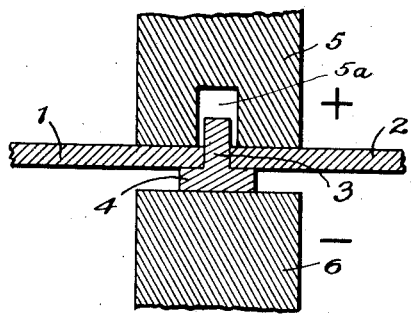
Figure 2:
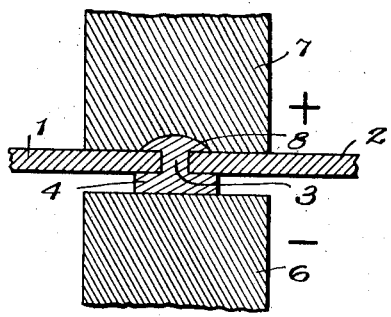

Figs. 1 and 2 are cross-sections illustrating successive steps in making a joint.

Referring first to Fig. 1, two parts 1 and 2 of sheet metal are to be united edge to edge. I first place between them a joint member having a web 3 filling the space between the edges of the parts 1 and 2 and having flanges 4 overlapping the edges of the parts 1 and 2. The parts thus assembled are held between two electrodes 5 and 6, the former having a recess 5ª to accommodate the projecting end of the web 3 of the joint members. The electrodes are pressed together to hold the parts against each other and a current is passed sufficient to soften the metal and to effect a weld between the overlapping portions of the joint member and the parts 1 and 2 to be united. The weld will first take place between the sheets and the flanges 4, since the contact surface between these is in the most direct path for the current and since the pressure is exerted mostly at these points. The current may be applied in such volume and for such a period, however, as to effect a weld also between the web 3 and the edges of the parts 1 and 2.

Another electrode 7, Fig. 2, is then substituted for the electrode 5 and the parts again pressed together and the current passed between the electrodes 7 and 6. The electrode 7 has a hollow end shaped to upset and spread the end of the joint member so as to form flanges 8 which overlap the edges of the parts 1 and 2 and, by a continuation of the pressure, the overlapping flanges 8 are welded to the sheet metal parts 1 and 2.

If desired the projecting parts of the joint member may be softened and pressed together sufficiently to bring one or both of them substantially flush with the surface of the parts 1 and 2.

The product thus obtained presents a more attractive appearance than the ordinary butt welded joint with its irregular burrs projecting from the surface, and avoids the expense heretofore involved in the removal of such burrs.

The method is also more convenient in some respects than the usual butt welding operation for joining two sheets because of the comparative difficulty of clamping the sheets to the electrodes so that they may be pressed together by means of the electrodes.

Though I have described with great particularity of detail certain embodiments of my invention, yet it is not to be understood therefrom that the invention is restricted to the particular embodiments disclosed. Various modifications in the details and in the apparatus employed may be made by those skilled in the art without departing from the invention as defined in the following claims.

What I claim is—

1. The method of electrically welding two parts together which consists in providing a joint member with a web wider than the thickness of said parts and with a pair of flanges, both at one edge of the web, placing each of the two parts with one of its faces against one of said flanges and an edge against said web, pressing said parts against the flanges and passing a welding current across the contacting faces of said parts with said flanges so as to form welded joints between such faces and, after said welded joints are formed, upsetting and spreading the projecting portion of said web to overlap it on the edges of said parts.

2. The method of electrically welding two sheets 1 and 2 together which consists in providing a joint member with a web 3 of greater width than the thickness of said sheets and with a pair of flanges 4, both at one edge of said web, placing the two sheets together each with one of its faces against one of said flanges and with an edge against said web, pressing said sheets against said flanges by means of electrodes and passing a welding current between the electrodes and across the contact faces of the sheets and flanges so as to form a welded joint between such faces and, after such joint is formed, pressing an electrode against the projecting edge of the flange 3 and against the outer face of the flanges and passing a current through said web so as to upset the projecting edge thereof and spreading it to form flanges 8 overlapping the edges of the sheets and welded thereto.

In witness whereof, I have hereunto signed my name.

THOMAS E. MURRAY, JR.